(No Model.)
W. P. MILLER.
PROCESS OF RECOVERING PRECIOUS METALS.
No. 492,040. Patented Feb. 21, 1893.
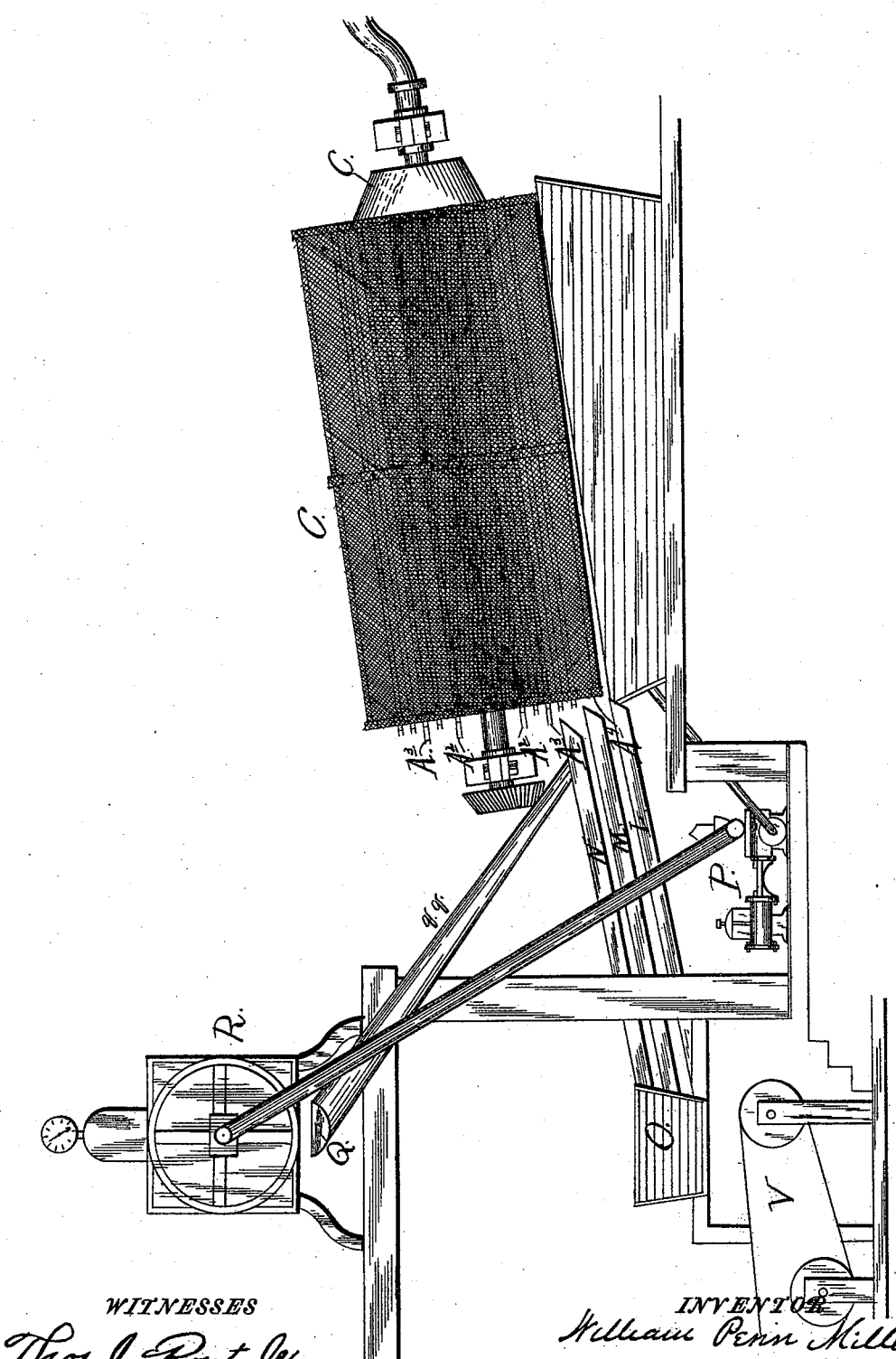
WITNESSES
INVENTOR
William Penn Miller
Jn. A. H. Evans & Co.
Attorneys.

UNITED STATES PATENT OFFICE.

WILLIAM PENN MILLER, OF REDDING, CALIFORNIA.

PROCESS OF RECOVERING PRECIOUS METALS.

SPECIFICATION forming part of Letters Patent No. 492,040, dated February 21, 1893.

Application filed October 23, 1891. Serial No. 409,615. (No model.)

*To all whom it may concern:*

Be it known that I, WILLIAM PENN MILLER, a citizen of the United States, residing at Redding, in the county of Shasta and State of California, have invented certain new and useful Improvements in Processes of Recovering Precious Metals; and I do hereby declare the following to be a full and clear description thereof, reference being had to the accompanying drawing, forming part of this specification.

The figure illustrates one form of apparatus suitable for carrying out my process.

My invention relates to the recovery of the precious metals or minerals containing the same from muddy slimy water, in which they are held in suspension during the process of reduction, amalgamation and concentration; and my invention consists essentially in dividing or separating the waters which carry the slimes containing gold, silver and other metals, from the sands and coarse gangue, while the whole pulp sands, gangue, sulphurets, slimes, metals and water are in active motion and agitation, and accelerating the agitation by mechanical means, thus affording no opportunity for any of the mud, slime or fine material to settle or become commingled with the sands or coarse gangue, as I shall hereinafter fully describe and claim.

In the treatment of material containing precious metals, losses occur in the following manner: More or less of the gold and silver, and other metals of value, contained in the matrix or vein matter, is found to be in different combinations with sulphides, sulphates, chlorides, carbonates, tellurides and oxides with other metals, that from their baseness prevent free amalgamation, and from their extreme fineness and scaly nature have a tendency to combine with minute air globules, and from other causes are held in suspension, or in a state of flotation upon and mingled with the waters as an impalpable powder. These losses occur to a greater or less extent in the crushing, reduction and milling of all gold and silver bearing ores, particularly in ores found in serpentine and talcose slate formations. The purpose of my invention is to effectually recover these suspended metals and slimes and to improve the present method of concentrating sulphurets from the sands and tailings.

As will be observed my process permits of no opportunity of settling or of any loss thereby of any of the slimy values. All the pulp comprising sands, sulphurets, metals, slimes, muddy waters and all other matter and material that has not been amalgamated, is conveyed into the separator C C to which a rotary movement is preferably imparted by a mechanism substantially like that shown hereinafter and which forms the subject matter of a separate application filed December 10, 1892, Serial No. 454,745. The screens or separators are of fine wire cloth and are preferably three in number, the inner one being of a size finer than the screen placed at the discharge of the crushing plant, the middle screen a size finer, and the outer screen of a fineness permitting nothing but the waters and fine muds and slimes to pass through; the sizes of the mesh of these screens can be regulated according to the grade of material desired to pass over and through each. The purpose of these different screens is to cause the inner member to separate and carry the coarser sand and material to the outlet $A^2$ at lower end, the material passing through the first or innermost screen being somewhat finer, the sand with the slimes passes to the middle screen, which again carries the sands and coarser material that passed the inner screen, to the outlet $A^3$ at lower end, the still finer sands and slimes passing the middle screen upon the outer and final screen of very fine cloth, that permits the water and slimes to pass through to the tank K, the fine sands being carried to outlet $A^4$ at lower end. The purpose of these series of screens of different mesh is to cause the inner member to separate the coarser sands and material from the slimes and finer material, the coarser sands and material being carried onto the outlet thereof, thus protecting the fine material of which the outer screen is composed from wear and injury. From this description it will be seen that all of the material which is fine enough to pass through the inner screen with the water, drops upon the middle screen, and all that is fine enough to pass through the middle screen, drops upon the outer screen, and the muddy waters slimes and exceedingly fine material passing through the meshes of the outer screen are caught in the tank K below, from whence they are immediately taken up by the pump P and forced into the hydraulic press.

In the drawing I disclose a complete plant under my process for the recovery of the muddy waters with their sedimentary values as they flow from the crushing, amalgamating, concentrating or any other device for reducing ore.

In the said drawing, C C is the separator or screens for receiving the material from the reduction works.

K is the receiver or tank for the muddy waters.

P is the power pump.

R is the hydraulic filtering press.

Q is the trough catching the clear water from the press R. q q conduits conveying the clear water from trough Q to the aprons or receivers N, M, L, which convey the sands and coarse material escaping from the muddy waters and sediments to tanks O.

V are concentrators used, if found necessary, to concentrate the coarse material from tanks O.

In my process there is a perfect separation under a continuous flow of the whole mass. The muddy waters, with its sediment and fine material passing through the different meshes into the tank K and the sands, coarse gangue and other material conveyed upon the different screens to be discharged clear, comparatively dry, free from all fine sedimentary matter upon the aprons N, M, L, to be carried away by the clean waters from press R. My process is thus continuous. The water, mud, sediment, sand, sulphurets, coarse gangue and other material enters the separator at C, clean water at same time being admitted, if desired, to the screens, the waters, and fine matter and material, discharging through the different meshes into tank K and the pump P immediately and continuously acting lifting this muddy and fine sediment (giving no opportunity to settle) from tank K, and forces it into the hydraulic press R, when the sedimentary matter is retained and the water clear and free from the muds, slimes and sedimentary values comes down from the hydraulic filtering press R in a regular and continuous flow, to perform the duty of again uniting with washed sands and coarse material to convey them away from the aprons N, M, L, to any point desired. These sands and coarse material being washed and separated from the muddy waters and slimy matter, are the better prepared for the separation of their sulphurets and gold values that escaped amalgamation, thus the sands are set free of worthless tailings.

I am cognizant of the fact that it is not new to recover solid matters from liquid mixtures and solutions by the hydraulic filtering of the same, as the same application is made in sugar manufacture, borax, whitening and other industries. I am also aware that the screening and dividing of certain material is not new, and am also aware the claims have been made for the recovery of the values contained in slimes and similar material containing metal from liquids, consisting essentially, in conducting the liquid and metal bearing material to a settling tank, allowing the gangue to fall to the bottom, drawing off the liquid and forcing it under hydraulic pressure through a filtering press and removing and drying the filtrates. I am also aware that settling tanks, have been extensively used. Many of such processes have been tried and found to be uncertain, impracticable and worthless on account of affording time and opportunity for loss of slime values to settle with and rest upon the sands and heavier material, thus dividing the values, a portion remaining with the waters, the balance going with the sands and heavier material, thus adding to the assay value of the sands, but not sufficient to warrant the treatment of the great mass for the recovery of the slimy values; and on the other hand depreciating the value of the sedimentary slimes, so that they cannot be handled profitably.

The filtering of the material must be by a hydraulic press that has capacity to handle the muddy waters flowing from the crushing plant or separated by my continuous separator, to recover all the sediment and press it into hard, compact and dry cakes. There is no time to remove the material for drying. Therefore for this purpose I use a well known press which can be made to retain the sediment for twenty-four (24) hours run from a large ore reduction plant. The muddy waters with their slimes, and sedimentary values all kept in continuous motion from the separator, to the tank, thence to the pump, thence to the hydraulic filtering press, where the sedimentary values are relieved of the water and recovered in cakes of perfect dryness, all done without manual labor. By this continuous automatic process large crushing plants can be made to recover the value of ore contents to a much higher percentage than by any other known process.

The concentrates from the sands are carried upon the concentrators with the clean returning waters from the press of my process, this clean water assisting concentration, as specific gravity defines itself the more readily in clear water, thus the concentration (the sulphurets) being freed from the sands, the latter are carried on by the continuous flow of the water into the water-ways and rivers as worthless tailings, having by the three separations or divisions been compelled to yield up their values.

Having thus described my invention, what I claim as new, and desire to secure by Letters Patent, is—

1. The process herein described for recovering precious metals, consisting essentially in dividing or separating the slimes and sedimentary matter during the period when it is continuously flowing from the reduction works and is commingled with the waters from said works and before said matter has had an opportunity to deposit itself or settle, substantially as herein described.

2. The process herein described for recovering precious metals, consisting in dividing or separating the slimes and sedimentary matter from the waters which contain them, while the whole pulp is continuously flowing; then washing the coarse material to free it of the slimes and sedimentary matter and muddy waters; then filtering said water and slimes and sedimentary matter, and then compressing and drying the filtrate, substantially as herein described.

3. The process herein described for recovering precious metals consisting essentially in dividing or separating the coarser material from the slimes and sedimentary matter without the aid of settling tanks and while the pulp is in an agitated condition, washing the coarser material to free it from the slimes, slums and muddy waters, collecting all the slimes, muddy waters and sedimentary material and forcing them through a filter press in which the slimes, mud and sedimentary material is compressed and dried in cakes and returning the filtered water to carry the coarser material and sands upon concentrators and from the works substantially as herein described.

4. The process herein described for recovering precious metals, consisting essentially in dividing or separating the coarser material from the slimes, sedimentary matter and muddy waters without the aid of settling tanks and while the whole pulp is in an agitated condition, introducing clear water to aid the washing of the coarser material to free it from the slimes, slums and muddy waters, collecting all the slimes, muddy waters and fine sedimentary matter and forcing them through a filter press in which they are compressed and dried in cake form, the filtered water returning to the tables at end of separator carrying the sands and coarser material upon concentrators, and finally from the works as worthless tailings, thus keeping up a continuous automatic operation, substantially as herein described and set forth.

WILLIAM PENN MILLER.

Witnesses:
 JABEZ CHADBOURNE,
 RUDOLPH M. SUELTZER.